United States Patent [19]
Strimel

[11] 3,721,119
[45] March 20, 1973

[54] TENSILE TESTING MACHINE
[75] Inventor: Robert S. Strimel, Penllyn, Pa.
[73] Assignee: Tinius Olsen Testing Machine Co. Inc., Willow Grove, Pa.
[22] Filed: Sept. 17, 1971
[21] Appl. No.: 181,437

[52] U.S. Cl..........................................73/95, 73/103
[51] Int. Cl...............................................G01n 3/08
[58] Field of Search.........................73/95, 159, 103

[56] References Cited
UNITED STATES PATENTS 3,530,709   9/1970   Nemeth...................................73/95
3,447,363   6/1969   Goldfinger..............................73/95

Primary Examiner—Jerry W. Myracle
Attorney—Frederick J. Olsson

[57] ABSTRACT

High speed repetitive testing machine for specimens such as paper, etc. The operator slides a specimen on a fixture which properly aligns the same along a test axis. A test button is pressed and the machine automatically carries out the following operation: the specimen is gripped, an extensometer positioned, load is applied, strain is measured directly from the specimen and at rupture the machine returns for another test.

18 Claims, 16 Drawing Figures

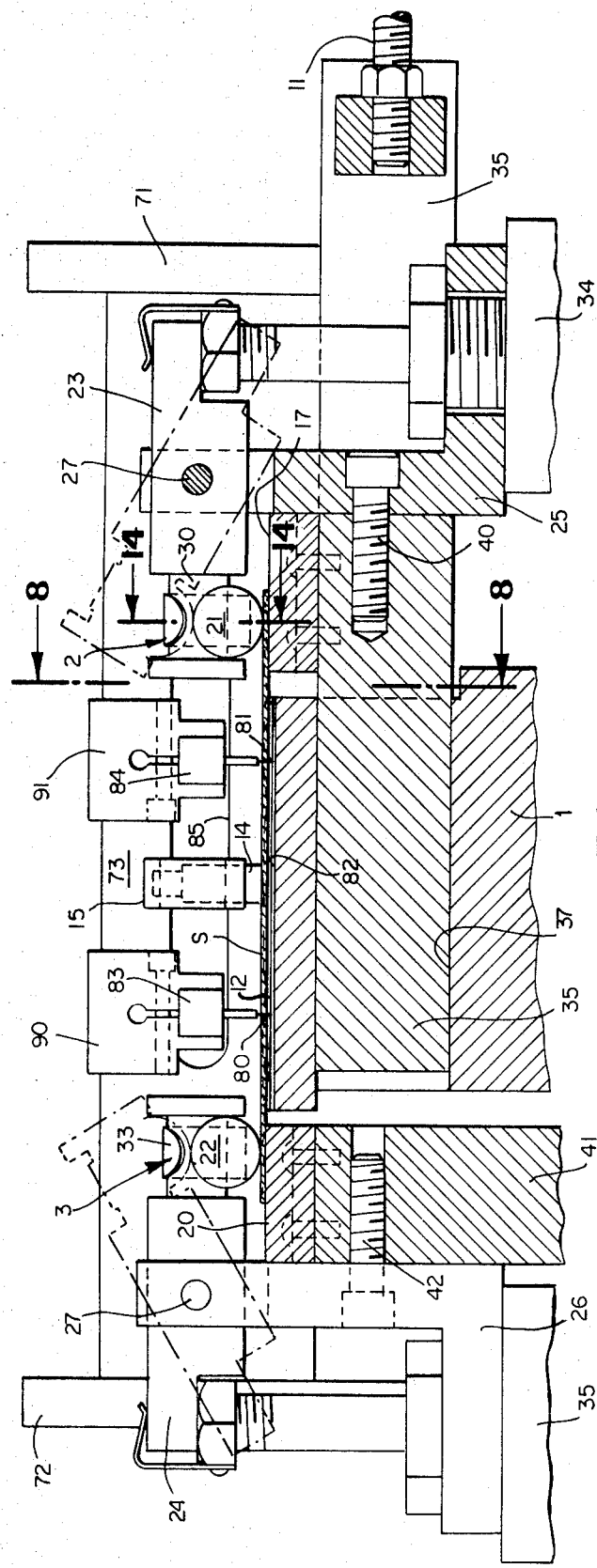
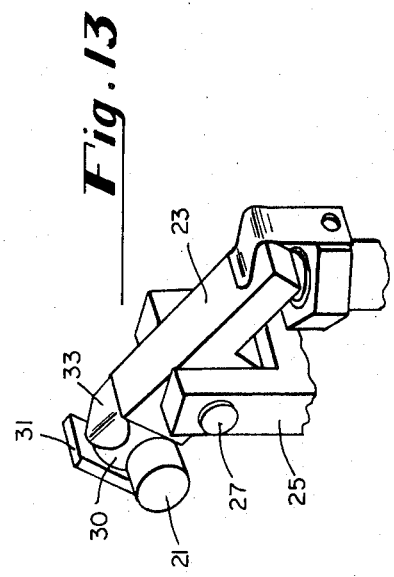
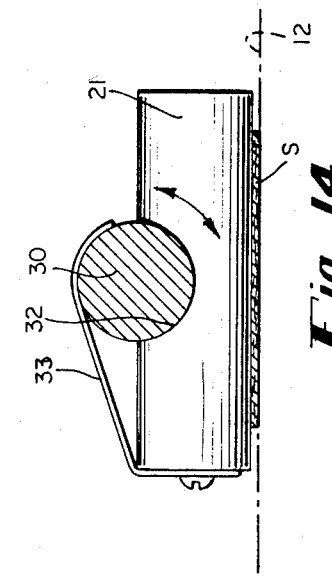

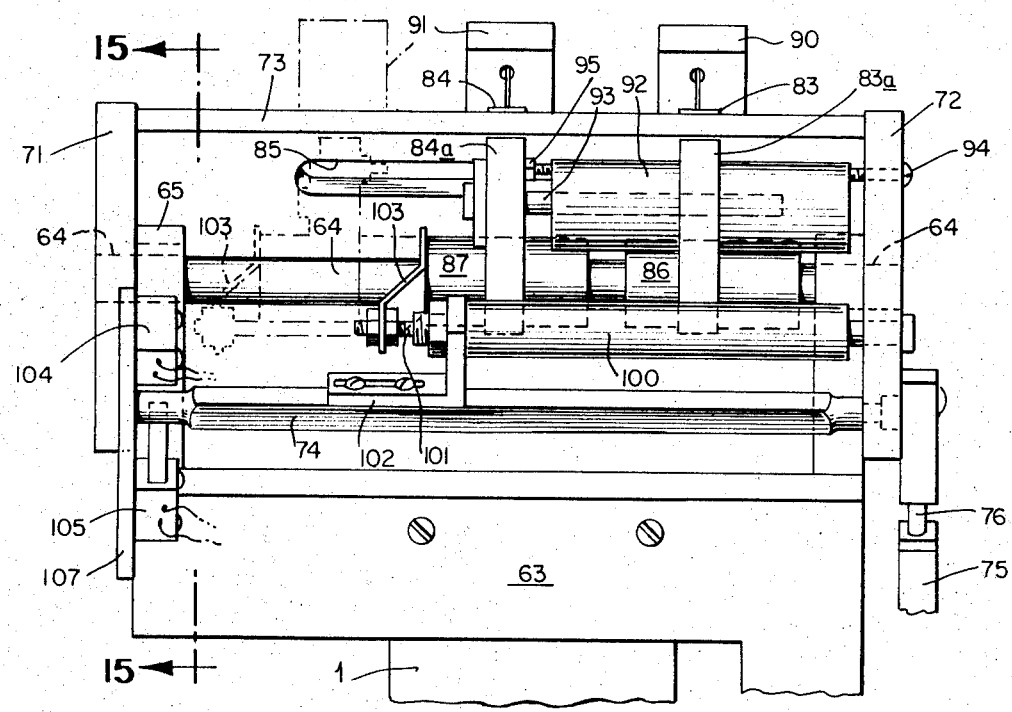
Fig. 5
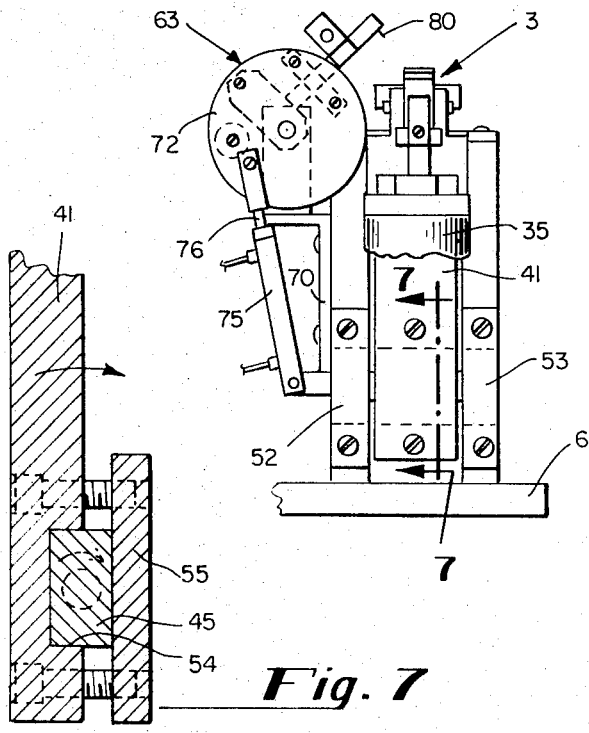
Fig. 6
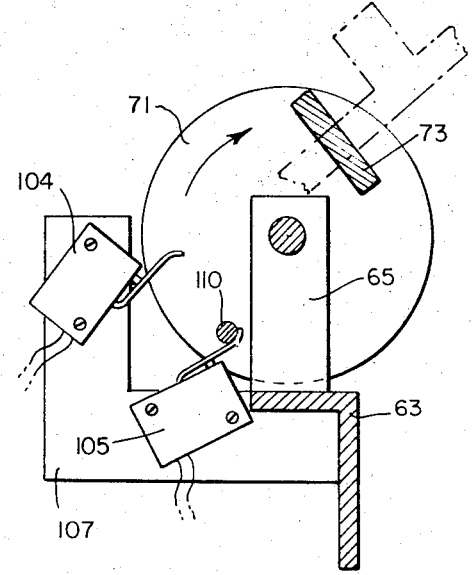
Fig. 15
Fig. 7

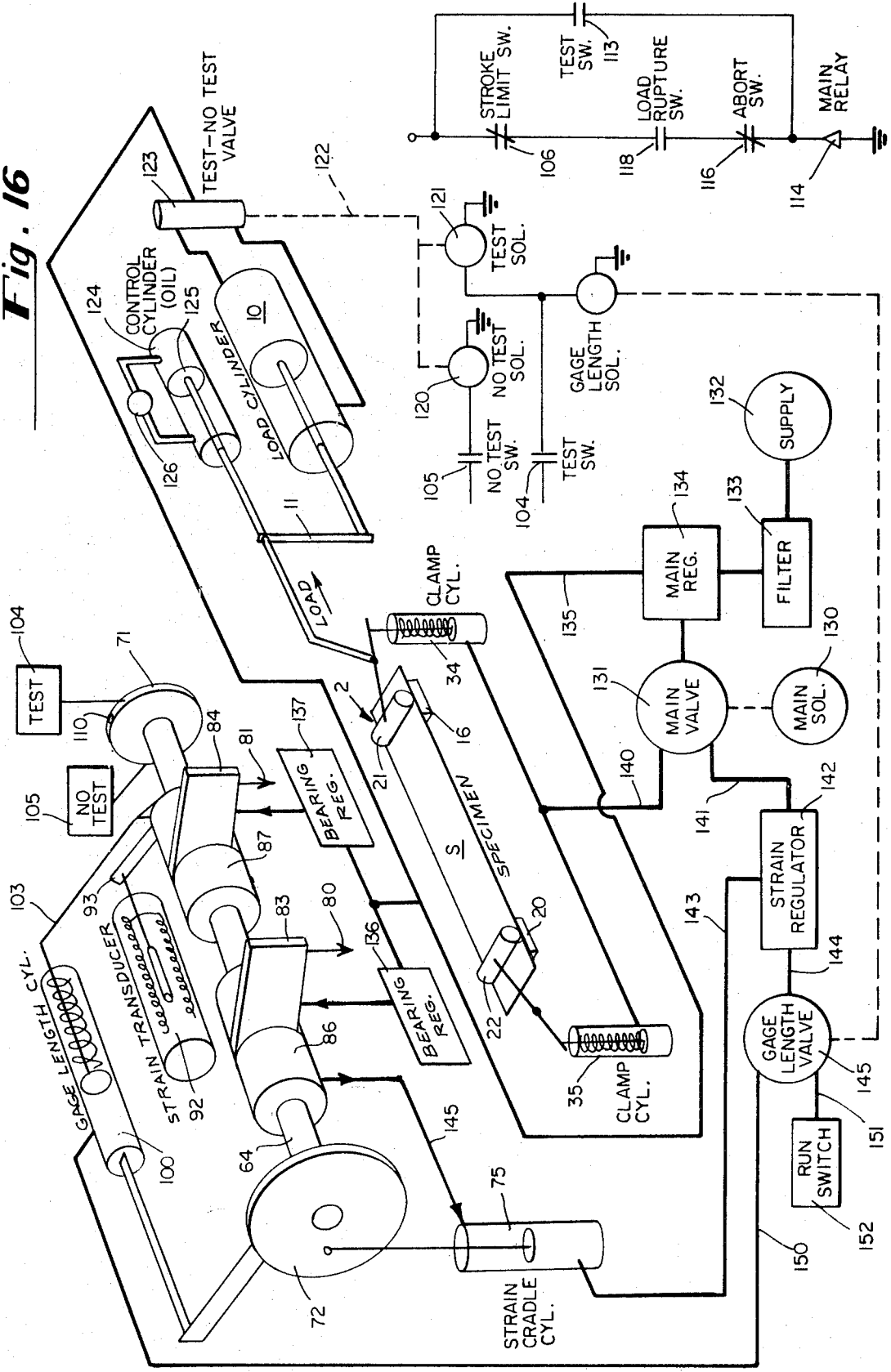

TENSILE TESTING MACHINE

This invention relates to physical testing machines particularly adapted to stressing thin specimens in tension and measuring the strain thereof.

The invention is disclosed in connection with a machine for production testing of thin paper specimens but it will be apparent to those skilled in the art as the description proceeds that the features of the invention are applicable to other types of physical testing machines for a wide variety of materials and in many diverse fields.

Among the several important and novel features disclosed herein are structures which singly and/or in combination provide for:

a. automatic alignment of the specimen axis with respect to the axis along which the specimen is to be stressed;

b. automatic release of the specimen from the alignment fixture during the test;

c. automatically operating clamps which align themselves with any taper in the specimen thickness;

d. finger blocking safety shields over the clamp which function in accordance with the griping and ungripping movement of the clamps;

e. extensometer means which measures strain directly from the specimen without adverse restraints on specimen strain;

f. extensometer means which automatically engages the specimen at the start of the test and automatically disengages at the end of the test;

g. extensometer strain followers which are automatically positioned at the proper gage length when in the nontesting position;

h. extensometer means having air bearings which mount specimen strain followers and provide for the followers to engage the specimen and move in accordance with the specimen strain in a friction free manner;

i. a load measuring torque bar which directly supports one of the specimen clamps, the clamp applies torque to the bar as a function of the load being applied to the specimen.

The foregoing features provide for high speed, repetitive, automatic testing in that the operator merely inserts the specimen on a table without fastening or otherwise manipulating the specimen. He then presses a test button which initiates clamping of the specimen, engagement of the extensometer at the proper gage length, the application of load until rupture, the disengagement of the extensometer and the return of the clamp for the next test.

For example, the machine disclosed herein is adapted for making repetitive tests on standard 1 inch wide paper specimens up to 0.020 inch thick at a rate of 50 specimens every 10 minutes. This satisfies the long felt need in the paper industry for a testing machine whose test speed is compatible with paper production speed so that quality control data can be applied to the production run from which it was obtained.

Other features and various advantages will readily be apparent to those skilled in the art by reference to the following specification considered in conjunction with the accompanying drawings forming a part thereof and it is to be understood that modifications may be made in the structural details there shown and described, within the scope of the appended claims, without departing from the scope and spirit of the invention.

FIG. 4 is an enlarged elevational view taken along lines 4—4 in FIG. 3;

FIG. 5 is an enlarged elevational view taken along lines 5—5 of FIG. 3 and showing the rear of the machine;

FIG. 6 is a reduced size elevational view taken along lines 6—6 in FIG. 2;

FIG. 7 is a fragmentary elevational view taken along lines 7—7 in FIG. 6;

FIG. 13 is a perspective view of a clamp;

FIG. 14 is a fragmentary view illustrating the self-aligning structure of the clamps;

FIG. 15 is a fragmentary view showing the test and no-test switches; and

FIG. 16 is a diagramatic view showing the electro-mechano-fluid pressure system.

Figure 1:
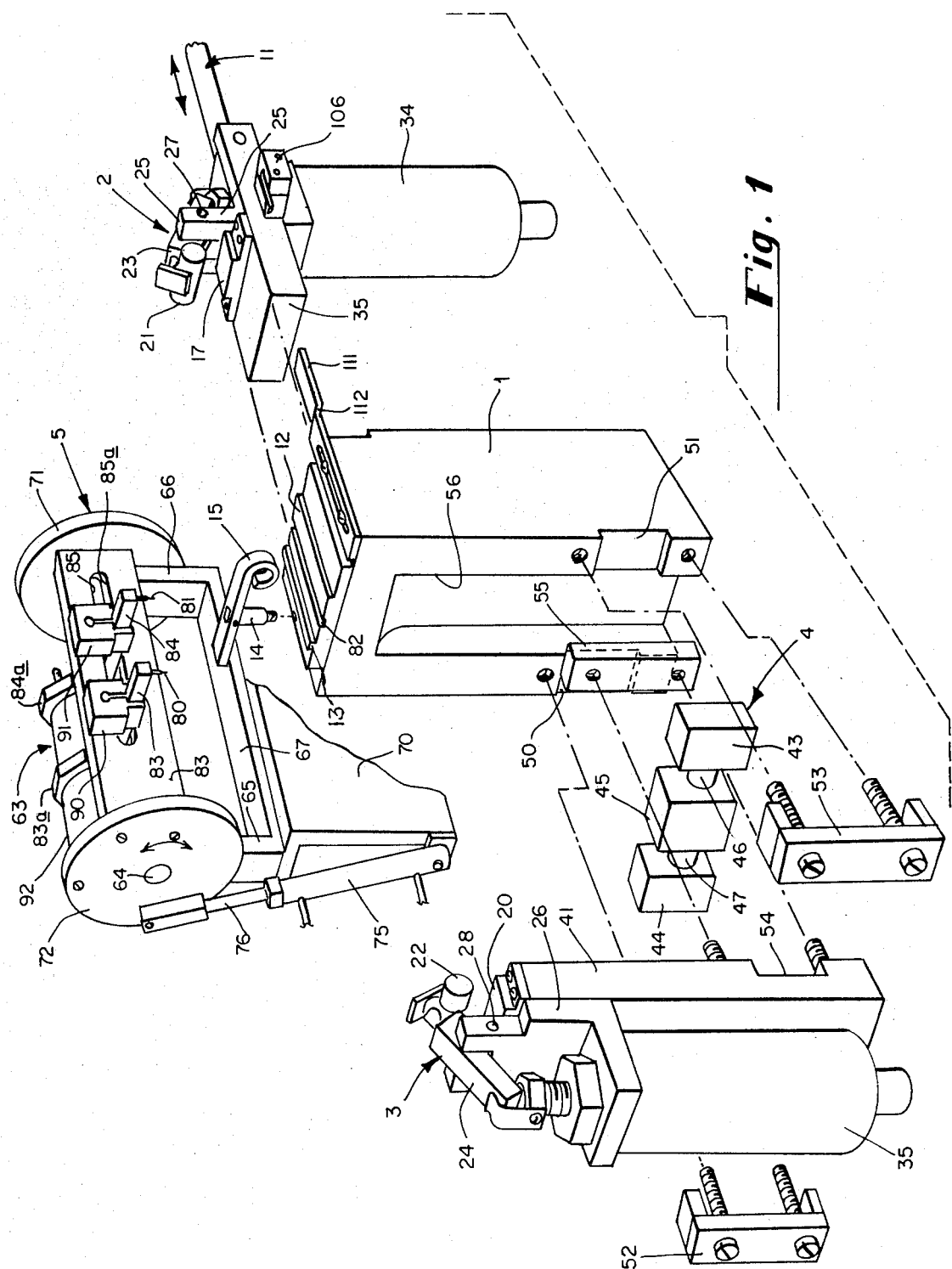
FIG. 1 is an exploded perspective view showing certain of the essential components of the invention.

In FIG. 1 a table for holding the specimen is indicated at 1. The table supports and properly aligns a specimen before the start of the test. The clamps for gripping the opposite ends of the specimen are indicated at 2 and 3. The clamp 2 is connected to a fluid motor (not shown) and is pulled to the right to impose a tension load on the specimen while the other end is gripped by the clamp 3. The clamp 3 is mounted on the torque bar 4. The clamp 3, which responds to movement of clamp 2 via the specimen imposes a torque on the bar 4 which yields or twists and strain gages on the bar measure the amount of the load. Numeral 5 indicates the extensometer for measuring the strain of the specimen during a test. The extensometer is rotatable between a test position where it engages the specimen for testing and a no-test position where it is completely disengaged.

Figure 2:
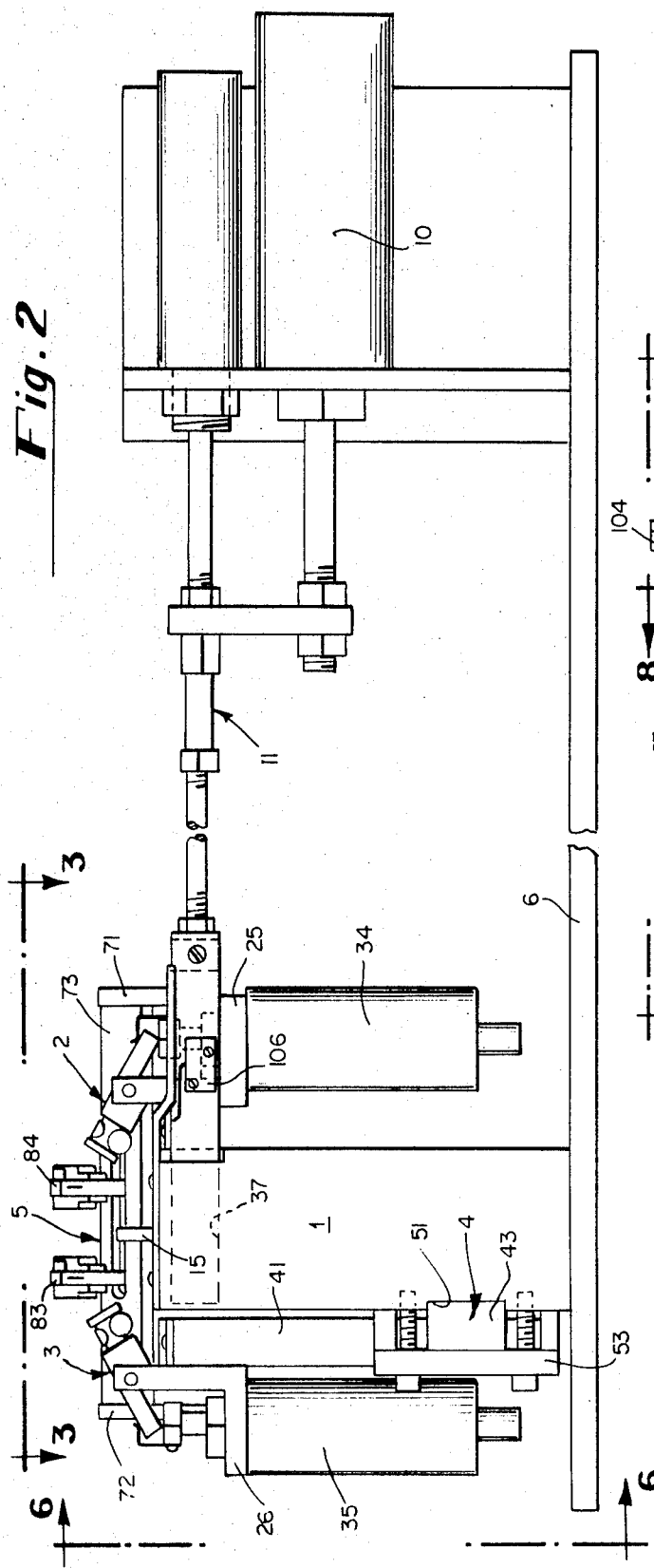
FIG. 2 is a front elevational view of the machine with the components of FIG. 1 joined together and connected with the load applying means.
Figure 3:
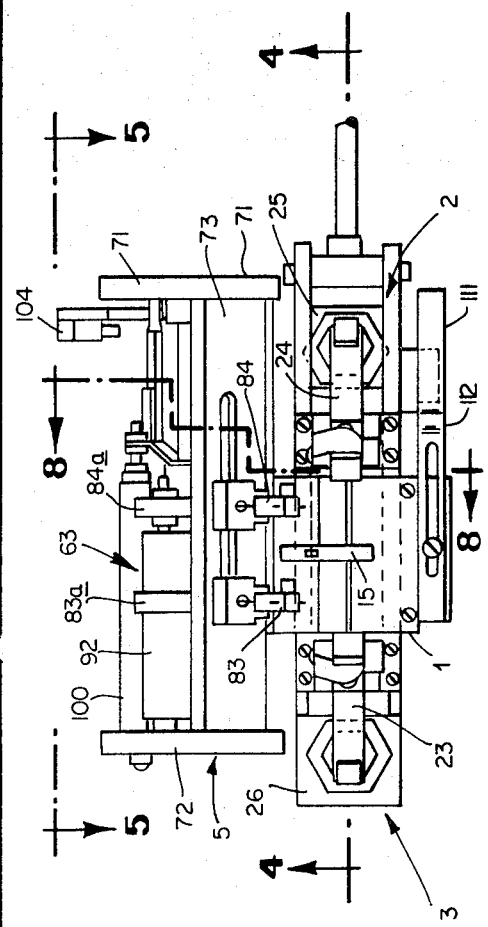
FIG. 3 is a plan view taken along lines 3—3 in FIG. 2 but omitting the load applying means.

The manner in which the above mentioned components are connected together is illustrated in FIGS. 2, 3 and 4 where it will be seen that table 1 is mounted on the base 6 which also supports the fluid motor or load cylinder 10 connected to the clamp 2 by means of the connecting rods 11.

The table 1 is generally elongated and extends in a vertical direction. The top of the table is provided with a flat surface 12 to the rear of which is upstanding flange 13. The surface 12 positions a flat paper specimen in a horizontal plane and the upstanding flange 13 is adapted to engage the edge of the specimen and orient the same with respect to the clamps 2 and 3 so that the specimen is properly aligned for the testing operation.

The top of the table also carries a paper hold-down device 14 which comprises the standard 15 fixed to the top of the table and a hold-down finger 16 pivotally mounted on the standard. Under the no-test condition (see FIG. 8) the weight of the hold-down finger biases the finger against the top of the table. For loading, the specimen is simply slid under the hold-down finger. When the extensometer becomes operative for the test the hold-down finger is automatically raised away from the specimen (see FIG. 9) in a manner explained later.

The clamps 2 and 3 are preferably identical in construction and each includes the lower fixed jaws 17 and 20 which are essentially flat but may be provided with small serrations not shown. The upper jaws are generally cylindrical in shape and are indicated at 21 and 22. The upper jaws 21 and 22 are adapted to be moved down against the lower jaws and thus clamp the specimen therebetween. The upper jaws 21 and 22 are mounted on the arms 23 and 24 respectively pivotally secured to the brackets 25 and 26 as by pivot shafts 27 and 28.

The clamps are made self-aligning to accomodate for any width-wide taper in specimens. The structure for accomplishing this is best indicated in FIGS. 13 and 14 which illustrate the clamp 2.

The outer end of the arm 23 has a cylindrical extension 30 terminating in the head 31. The upper jaw 21 has a cylindrical under-cut as indicated at 32 and the cylindrical extension 30 is disposed in the under-cut. As will be apparent from an inspection of FIG. 14 this connection provides that the jaw 21 can rotate with respect to the axis of the extension 30 in the event of a taper in the specimen. The rotary engagement between the extension and the jaw is maintained by the spring clip 33.

The arms 23 and 24 of the clamps are adapted to be actuated by air cylinders 34 and 35 which are respectively secured to the brackets 25 and 26 as is best indicated in FIG. 4.

The clamps, brackets and air cylinders are mounted as a unit on supports which provide for the clamp 2 to be movable for imposing a load on the specimen and for the clamp 3 also to be movable for purposes of measuring the load on the specimen.

Thus the clamp 2, bracket 25 and the air cylinder 34 are mounted on the clamp support 26 which is slidably arranged in a socket 37 in the top of table 1. The bracket 25 of the clamp 2 is secured to the clamp support 26 as by bolts 40. This structure provides for the clamp to be movable back and forth along an axis which is co-planar with the axis along which the specimen is stressed.

The clamp 3, bracket 26 and air cylinder 35 are mounted on vertically extending support 41 by virtue of the bracket 26 being secured by the bolts 42 (see FIG. 4). The support 41 is mounted on a torque bar 4 as explained following with particular reference to FIG. 1.

The torque bar 4 has outboard sections 43 and 44 and center section 45. The center section 45 is connected to the outboard sections by the yieldable sections 46 and 47. The outboard sections 43 and 44 are fitted in the sockets 50 and 51 formed in the bottom part of the table 1 and are clamped in position by clamps 52 and 53. The center section 45 fits into a socket 54 formed in the lower part of the support 41 and is held in position as by clamp 55.

From an inspection of FIGS. 1 and 2 it will be apparent that movement of the clamp 2 to the right will impose tension load on the specimen. This load will be transferred by the specimen to the clamp 3 and by virtue of the support 41, a torque will be imposed on the center section 45 of the torque bar. The sections 46 and 57 permit the center section to twist or yield with respect to the outboard sections and thus the clamp 3 and support 41 can partake of restrained tilting motion or rotation about the center of torsion.

The amount of twist of the sections 46 and 47 is directly proportional to the load applied. Strain gages (not shown) on the sections 46 and 47 are used to sense the amount of twist and the signals produced are fed to electrical circuits for calculating, displaying and printing out load values. In lieu of strain gages the invention contemplates the use of LVDT devices.

The width of the specimen, the position of the alignment flange 13, the pulling axis of the load linkage 11 are all co-planar. The torque bar is symmetrical with respect to this plane.

In connection with the operation of the clamps to impose a load, it is pointed out that during load application the portion of the specimen between the clamps is unrestrained and free to move. Firstly, the finger 16 is raised away from the specimen and secondly the specimen is raised away from the surface 12. This is done by making the surface 12 slightly lower than the surfaces 17 and 20 of the clamps. In other words the surface 12 is made slightly closer (in this case .005") to the axis of the torque bar 4 than are the surfaces 17 and 20. So when the clamps draw the specimen taut away from the table since it is supported on surfaces (17 and 20) which are spaced from the table surface 12.

Figure 10:
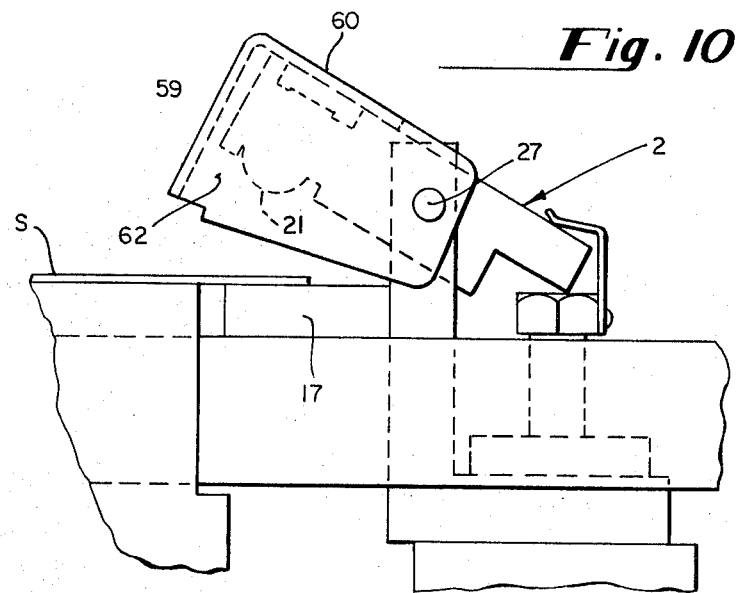
FIGS. 10 and 11 are fragmentary views showing the clamp guards or shields respectively in the no-test and test positions.
Figure 11:
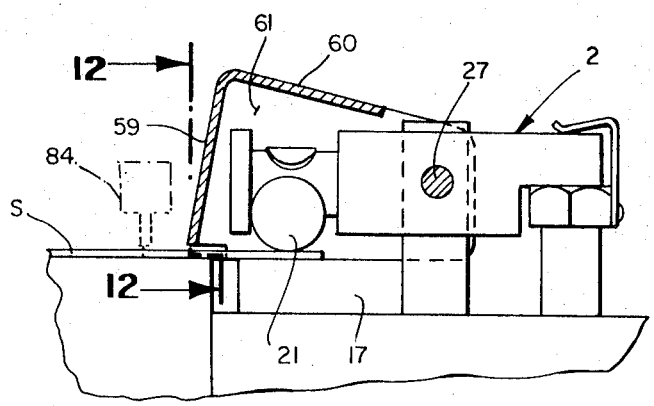
Figure 12:
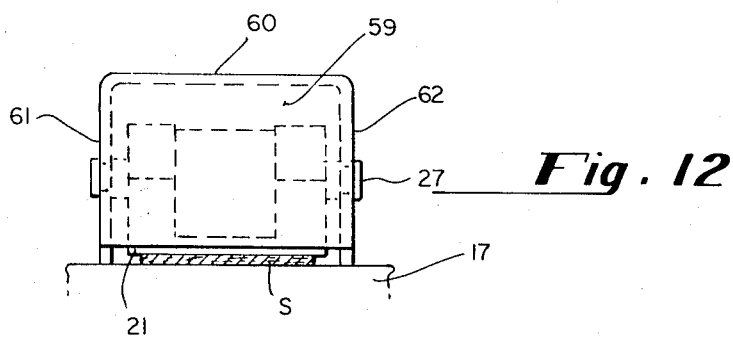
FIG. 12 is a fragmentary elevational view taken along lines 12—12 in FIG. 11.

The clamps 2 and 3 operate rapidly and generate considerable force. To minimize the possibility of an operator inserting a finger between the jaws of the clamps the invention contemplates automatically operating safety guards. These are shown in FIGS. 10, 11 and 12 which illustrate the guard for the clamp 3. The guards are not shown in the other drawings for sake of clarity. The guard 59 is mounted on the pivot 27 and is free to move with respect to the shaft 27. The guard has a top 60, front 61 and sides 62 and 63.

In the up position as shown in FIG. 10, the top 60 in engaged with the arm 23 and in the bottom position as shown in FIG. 11, the sides are engaged with the lower jaw 17.

In moving from the up position of FIG. 10 to the down position of FIG. 11 the arm and hood move downwardly together until the sides 62 and 63 contact the lower jaw and remain in this position while the upper jaw continues downwardly to perform its clamping operation; the reverse action takes place when the jaw unclamps.

It will be apparent from an inspection of the figures, that the hood shields or guards against an operator inserting a finger between the jaws when the hood is in either position.

The structure of the extensometer 5 and the manner of operation will next be described.

The extensometer 5 has a rotary strain cradle 63 fixed to the table 1. The cradle is rotatably mounted on shaft 64 supported in upright legs 65 and 66 of the bracket 67 which is disposed on the platform 70 secured to the table 1.

The strain cradle includes the end pieces 71 and 72 (which are respectively supported on the shaft 64) lift bar 73 and cross bar 74. The bars 73 and 74 hold the end pieces together.

The cradle is adapted to be rotated as by a double acting air cylinder 75 and its piston 76. The cylinder is pivotally secured to the end piece 72.

Figure 8:
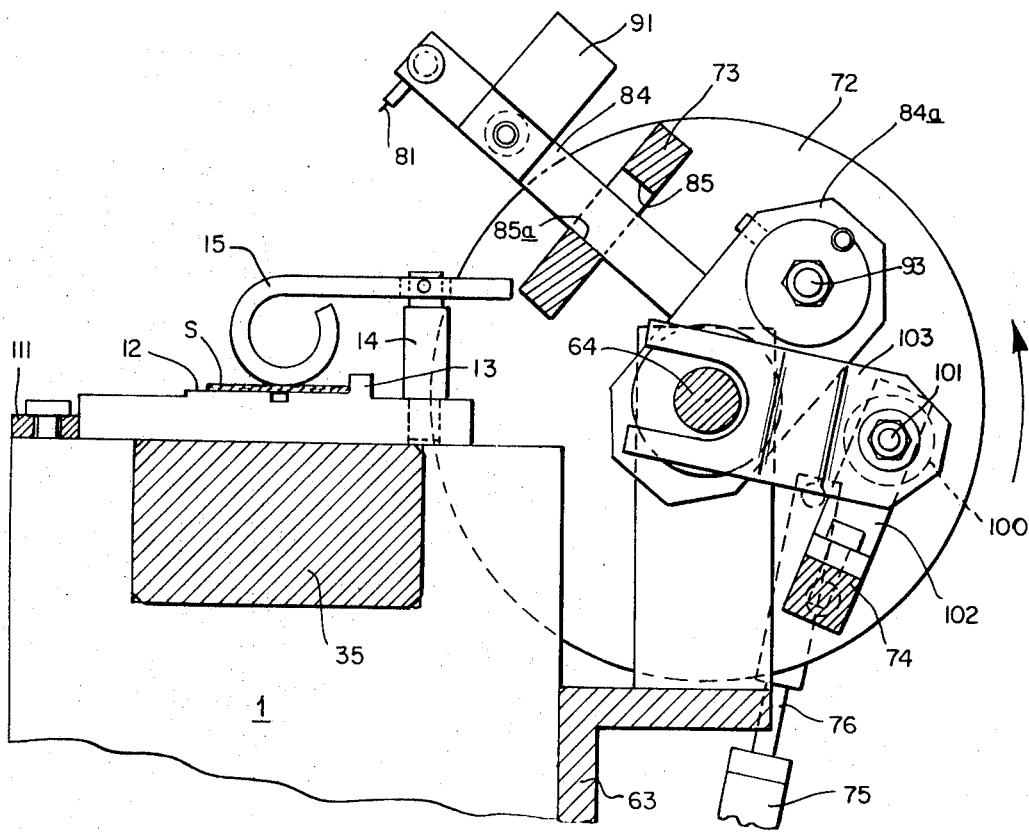
FIG. 8 is an enlarged fragmentary elevational view taken along lines 8—8 in FIG. 4 but with the extensometer in the no-test position.
Figure 9:
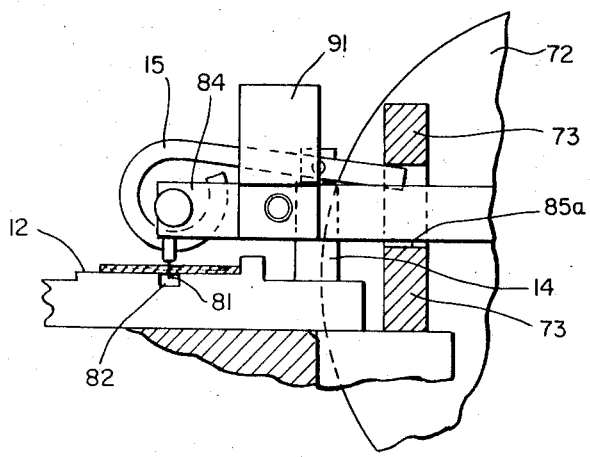
FIG. 9 is a fragmentary view of certain of the components of FIG. 8 but with the extensometer in the test position.

The strain cradle carries the strain to followers 80 and 81 which are adapted to contact a specimen mounted on the table and then follow the elongation or strain as the load is applied. The cradle moves the followers from the down or test position as shown in FIGS. 4 and 9 to the up or no-test position as shown in FIGS. 6 and 8.

In the particular embodiment disclosed, the followers are in the form of pins which are capable of piercing a paper specimen as is shown in FIG. 4. In order to accomodate the piercing condition the top surface 12 is under-cut with a channel as in 82. As the specimen stretches during a test the pins move along the slot.

As will be understood other types of strain followers such as knife edges are used for other types of material and the weight bias may vary depending on the contact or engagement conditions.

The followers are respectively mounted on arms 83 and 84 which extend through the slot 85 in the lift bar 73. The arms have heads 83a and 84a which are respectively connected to air bearings 86 and 87 mounted on the shaft 64. The air bearings are independently rotatable and movable in translation along the shaft.

The followers 80 and 81 are biased in a direction toward the table top by the respective weights 90 and 91 mounted on the arms 83 and 84. This bias will cause the arms 83 and 84 to rest on the bottom 85a of the slot 85. The weights also are instrumental in causing the followers to pierce a specimen and to maintain the followers in contact with a specimen as a test proceeds.

With the engagement of the arms with the bottom 85a of the slot 85 the rotation of the cradle will cause the arms to move as between the test and no-test positions. The test position of the cradle is determined by the engagement of the bottom of the lift bar 73 with top of the table 1 as is best shown in FIG. 9. The no-test position (FIG. 8) is determined by the travel limit of the piston 76 in the cylinder 75.

During a test the strain followers 80 and 81 are essentially free from any restriction so that they can accurately follow the strain of the specimen. In the test position (FIG. 9) it will be seen that the bottom 85a of the slot 85 is spaced down away from the arms, so as not to impose a frictional restraint on the arms as they are moved with the followers. Also the air bearings 86 and 87 float on a band of air around the shaft 64 and are essentially friction free.

For determining the amount of follower movement or strain the cradle carries a transducer coil 92 and its core 93 (FIG. 5). The coil is fixed on the head 84a on the air bearing 86 and the core is fixed to the head 83a on the air bearing 87.

The gage length of the followers is set by the relative position of the coil and core elements at the notest condition, the coil and core being automatically engaged in fixed position as will be explained below.

The adjusting screw 94 in the end piece 72 is engaged with the coil element and determines the fixed position to the right.

The adjusting screw 95 on the head 83a (holding the core) engages the opposite end of the coil and determines the relative position of coil and core in the fixed condition as shown in FIG. 5.

The coil and core are brought to the position of FIG. 5 by the air cylinder 100 and its piston 101. The cylinder 100 is held on the cross bar 74 as by the bracket 102. The piston carries a gage arm 103 which bears against the air bearing 87. The proper introduction of air into the cylinder 100 will cause the arm 103 to engage the air bearing 87 and move the same to the right bringing the adjusting screw 95 in engagement with the coil 92 and turn moving the coil as mounted on the air bearing 86 up against the adjusting screw 94.

The position of the parts in FIG. 5 is the condition of no-test with the strain followers at the desired gage length and the coil and core in a zero or in a known voltage condition. When the strain cradle moves the followers to the test position the cylinder is energized so that the arm 103 is moved to the left away from the bearing 87 as indicated by the dotted lines 103 in FIG. 5. The bearings therefore are free to move on the shaft.

The components heretofore described are adapted to be operated by electrical and air systems which operate automatically to carry out a test program. The signals from the strain gages in the torque bar and the signal from the transducer are fed to control equipment which visually displays stress and load, operates a stress-strain recorder and in the case of paper testing automatically calculates and displays and prints the TEA value.

Before describing the electrical and fluid pressure circuits which cause automatic operation of the machine reference is made to the test and no-test switches 104 and 105 (FIG. 15) and to the stroke limit 106 (FIG. 1 and 2).

The switches 104 and 105 are mounted on a bracket 107 connected to the platform 63. The arms of the switches are adapted to be contacted by the finger 110 on the end piece 72 of the cradle. In FIG. 15 the parts are in the no-test condition and the finger 110 is in contact with the arm of the switch 105. When the cradle is rotated to the test position the finger 110 contacts the arm of the switch 104 to initiate certain operations as will be explained later.

The stroke limit 106 is attached to the clamp support 35 and is movable therewith. A finger 111 for actuating the switch is secured to the table 1 and the finger is set up so that after specimen rupture the arm of the switch 106 can engage the cam surface 112 and terminate the test.

Referring now to the FIG. 16 the main test switch is indicated at 113. This switch is adapted to energize the main relay 114. The switch 113 is of the momentary-contact type and a holding circuit includes the stroke limit switch 106, load rupture circuit switch 115 and the abort switch 116. The load rupture switch is adapted to be closed by mechanism in the control equipment upon the actuation of the main relay. The abort switch is available for the operator in the event of a requirement for emergency termination of a test. If any of these switches are opened during the test the test will be stopped.

The load rupture switch 116 is in the control equipment and it can be set to open as a function of the rupture of the specimen as determined by the information obtained from the strain transducer and the torque bar strain gages.

The switches 104 and 105 respectively control the solenoids 120 and 121 which have a mechanical connection 122 with the test-notest valve 123. The valve 123 controls the operation of the load cylinder 10 either to move the rods 11 and clamp 2 to the right to load the specimen or move to the left for returning to the no-test condition.

When the no-test switch 105 is closed the test switch 104 will be open and energizing the solenoid 120 causes the valve 10 moves the clamp 2 is determined by the control cylinder 124. The cylinder so that the load cylinder 10 moves the clamp 2 in the no-test position. When the switch 105 is open the switch 104 is closed to energize the solenoid 121 and cause the valve 123 to operate so that the load cylinder 10 moves the clamp 2 for loading the specimen.

It is pointed out that when the valve 123 is activated for the test condition, the rate at which the load cylinder 124. The cylinder contains oil on both sides of its piston 125 and the transfer of oil between the opposite sides of the piston is determined by the setting of a valve 126. By appropriately adjusting the valve 126 the rate at which the specimen is stressed can be determined. The valve 126 is set up so that the load piston can move rapidly in the opposite direction to the no-load condition.

Now assume the machine is in the no-test condition and the operator had loaded a specimen and pressed the test switch 113 and the main relay is energized and held by the holding circuit. The energizing of the main relay activates the main solenoid 130 which in turn operates the main valve 131. The main valve 131 is supplied with air from the air supply 132, filter 133 and main regulator 134.

The regulator 134 supplies air to line 135 connected to the air bearing regulators 136 and 137 and also to the valve 123. It will be observed that the air bearings and the valve 123 have a constant supply of air.

The actuation of the main valve causes the operations described following:

The main valve simultaneously supplies air to the lines 140 and 141. The line 140 supplies air to the clamp cylinders 34 and 35 which function to close the clamps 2 and 3 on a specimen mounted on the table. The line 114 supplies air to the strain regulator 142 which in turn supplies air to the lines 143 and 144.

The line 143 supplies the air to the strain cradle cylinder 75 which causes the strain cradles to rotate to bring the followers 80 and 81 down into contact with the specimen mounted on the table.

Incidently the strain cradle cylinder 75 also is supplied with air from the exhaust side of the air bearings through line 145. The purpose of this connection is to supply air to rotate the strain cradle to the no-test position.

The line 144 supplies the gage length valve 145 which controls the air to the lines 150 and 151. The line 151 supplies air to the gage length cylinder 100 which operates to move the gage arm 103 away from the air bearing 87. The line 15 supplies air to the run-switch 152.

The actuation of the run switch causes certain circuits in the control equipment to be activated. The circuits control the recording and printing of the stresses, strain and TEA values.

When the strain cradle moves from the no-test position to the test position the no-test switch is closed. This de-energizes the solenoid 120 and energizes the test solenoid 121 which actuates the valve 123 to cause the load cylinder 10 to begin moving the clamp 2 to the right and apply the load to the specimen.

After the specimen ruptures either the load rupture switch 115 or the stroke limit switch 106 is opened to de-energize the main relay 114. This causes the clamps to release the specimen, the strain cradle to rotate back to the no-test position, the load cylinder to return the clamp 2 to the no-test position, the gage length cylinder to restore the gage length and the run solenoid to deactivate the electronic circuits in the control equipment.

It will be noted that the load cylinder does not return the clamp until the strain cradle has reached the no-test position to close off the no-test switch 105 (the switch 104 is opened when the cradle leaves the test position).

When the machine has returned to the no-test condition the pieces of the ruptured specimen are removed and a new specimen inserted and the new test commenced as previously described.

Before closing it is pointed out that the means for imposing a load on the specimen may be in mechanical form such as a conventional screw type system.

I claim:

1. In a testing machine for applying a load to a specimen for testing the same:

an elongated, vertically extending table having a top surface for positioning a specimen to be tested;
a socket formed in said table;
a first support slidably mounted in said socket;
a first lower jaw mounted on said first support;
a first upper jaw pivotably mounted on said first support;
fluid pressure means mounted on said first support and connected with said first upper jaw for moving the same toward the first lower jaw whereby the first jaws grip one end of a specimen;
a torque bar mounted adjacent the bottom of said table, the torque bar including a yieldable center section;
a second support mounted on said yieldable center section and extending upwardly adjacent the top of said table;
a second lower jaw mounted on said second support;
a second upper jaw pivotably mounted on said second support;
fluid pressure means mounted on said second support for moving the second upper jaw toward the second lower jaw whereby the second jaws grip the opposite end of the specimen, said yieldable center section providing for the second jaws and second support to partake of restrained tilting motion upon application of torque; and means operable when the first and second jaws have gripped a specimen to move said first support and said first jaws whereby to impose a load on the specimen, the specimen transmitting the load to said second jaws whereby to apply torque thereto and cause the second jaws and the second support to tilt, the tilt being restrained by the yieldable center.

2. In a testing machine for applying a load to a specimen for testing the same:
   a first clamp for engaging and holding one end of a specimen during a test;
   first support means for said first clamp;
   a second clamp for engaging and holding the opposite end of specimen during a test, said first and second clamps holding the specimen for application of load along an axis;
   second support means for said second clamp;
   mounting means for said second support means including a fixed member and a yieldable member connected thereto, the members being transversely spaced from said axis, the second support means being mounted on the yieldable member and the yieldable member providing for the second support means and the second clamp to partake of restrained tilting motion during the entire time of the application of torque to the clamp; and
   means connected with said first clamp to move the same in a direction to apply a load to the specimen, the specimen transmitting the load to the second clamp whereby to apply torque thereto and cause the second clamp and the second support to tilt, the tilt being restrained by the yieldable member.

3. In a testing machine for applying a load to a specimen for testing the same:
   a table having a top surface for positioning a specimen to be tested;
   a socket formed in said table adjacent the top thereof;
   a first clamp support slidably mounted in said socket;
   first clamp means mounted on said support on one side of said table, the first clamp having a pair of jaws for gripping one end of a specimen mounted on said table;
   a torque bar mounted adjacent the bottom of said table, the torque bar having a yieldable center section;
   a second clamp support mounted on said center section and extending upwardly adjacent the top of the table on the opposite side thereof;
   second clamp means mounted on said second clamp support and having a pair of jaws for gripping the opposite end of a specimen mounted on said table; and
   means operable when said clamps have gripped a specimen to move said first clamp support whereby to move said first clamp means whereby to impose a load on the specimen.

4. In a testing machine for applying a load to a specimen for testing the same:
   a first clamp for holding one part of a specimen during a test;
   a second clamp for holding another part of a specimen during a test, the first and second clamps holding the specimen for application of a load along an axis; and
   mechanism connected between the clamps and mounting the same for relative motion along the said axis whereby to apply a load to the specimen the mechanism including yieldable means spaced transversely from said axis and mounting one of the clamps, the yieldable means restraining and permitting said relative motion during the entire time the load is applied.

5. In a testing machine for applying a load to a specimen for testing the same:
   table means to support and orient an elongated specimen in position for being gripped by clamps, the table being dimensioned so that opposite ends of the specimen extend away from the table for engagement respectively with clamps;
   a pair of clamps disposed on opposite sides of the table, each clamp having a pair of jaws for accepting an end of the specimen and gripping the ends therebetween; and
   means connected between said clamps for relatively moving the clamps in a direction along the axis of the specimen for applying a load to the specimen, the jaws of each clamp gripping the specimen with respect to the table so that as the jaws move the specimen is moved away from the table whereby to avoid frictional loads during a test.

6. In a testing machine for applying a load to a specimen for testing the same;
   a flat, horizontally extending table for receiving a specimen and positioning the same in a horizontal plane and a flange extending vertically upwardly from said table, the flange being for engaging and orienting a specimen on the table;
   a pair of lower, flat, horizontally extending clamp jaws respectively disposed on opposite sides of said table for receiving respectively the ends of a flat specimen mounted on the table;
   a pair of upper clamp jaws respectively mounted for movement toward and away from said lower jaws to clamp a specimen therebetween, the plane containing the surface of said table being spaced downwardly from the plane containing the surfaces of the lower clamp jaws; and
   means connected between said pairs of jaws to relatively move the same away from one another in a direction along the axis of the specimen, the movement of the jaws away from one another lifting the specimen upwardly away from said table whereby to avoid frictional loads during a test.

7. In a testing machine for applying a load to a specimen for testing the same;
   a flat horizontally extending table for receiving a specimen and positioning the same in a horizontal plane and a flange extending vertically upwardly from said table the flange being for orienting a specimen mounted on the table;
   a first clamp comprising a lower jaw and an upper jaw disposed on one side of the table;
   mechanism connected with the first clamp for relatively moving the jaws for clamping and unclamping a specimen;
   a second clamp comprising upper and lower jaws;

mechanism connected with the second clamp for relatively moving the jaws for clamping and unclamping a specimen; and mechanism connected with said clamps to relatively move the same in a direction along the specimen axis for applying load to the specimen and to cause relative motion between the specimen and the table in direction transverse the specimen axis whereby the specimen is out of contact with the table when the load is being applied whereby to avoid frictional loads during a test.

8. In apparatus for applying a load to a specimen for testing the same:

a member for positioning an elongated specimen;

an extensometer;

means to cause the extensometer to engage the specimen when same is disposed on said positioning member; and means to apply a load to the specimen in a direction along the specimen axis and also to cause, when the load is applied, relative motion between the specimen and the positioning member in a direction away from one another so that the specimen and member are spaced apart during a test whereby to avoid frictional loads.

9. In a testing machine for applying a load to a specimen for testing the same;

a clamp support;

a lower jaw mounted on said support, the lower jaw having a substantially flat surface;

an upper jaw arm;

pivot means mounting the upper jaw arm on said support;

a cylindrically shaped extension formed on one end of said arm;

a cylindrically shaped upper jaw formed with a circular under-cut in the top thereof, said extension being disposed in said under-cut; and a resilient strip fixed to said upper jaw and extending over and engaging said extension and maintaining the upper jaw on the extension, the semi-circular cut-out and the strip providing for the upper jaw to move about the extension for the purpose of accomodating irregularities in specimen thickness.

10. In a testing machine for applying a load to a specimen for testing the same:

a clamp support;

a lower jaw mounted on said support;

an upper jaw arm;

an upper jaw mounted on said arm, said jaws forming a clamp;

means including a shaft rotatably mounting the arm on the support for rotation between a down position wherein the upper jaw clamps a specimen to the lower jaw and an upper position wherein the upper jaw is spaced away from the lower jaw; and a hollow hood providing a means guarding against an operator putting a finger between the upper and lower jaws, the hood being rotatably mounted on said shaft and having a front, a top and sides and being disposed over said upper jaw and operating as follows:

when the upper jaw is in the upper position, the top engaging the arm and the sides extending downwardly below the upper jaw;

when the upper jaw moves downwardly from the upper position, the hood moving with the jaw until the sides interengage the clamp support, the rotatable connection providing for the hood to remain fixed while the jaw continues to move downwardly;

when the jaw is in the down position the sides remaining in contact with the support.

11. In a testing machine for applying a load to a specimen for testing the same:

means for mounting and for applying a load to a specimen along an axis;

a pair of air bearings;

means mounting the air bearings for independent translatory motion in a direction along an axis parallel to said specimen axis and for independent rotation about the axis;

a pair of strain followers;

means respectively connecting the strain followers with the air bearings for motion therewith;

means to maintain the air bearings in a fixed known relationship in a direction along said air bearing axis when the specimen is not under test whereby the followers are spaced apart at a known gage length;

means for rotating each bearing whereby the respective followers engage a specimen during a test and are disengaged from the specimen when a test has been completed; and means to maintain the strain followers in contact with a specimen during a test, the translatory motion of the air bearings providing for the followers to move as a function of the strain of the specimen.

12. In a testing machine for applying a load to a specimen for testing the same:

a first clamp for engaging and holding one end of a specimen during a test;

support means for said first clamp;

a second clamp for engaging and holding the opposite end of a specimen during a test:

support means for said second clamp including a yieldable member transversely spaced from the specimen, the yieldable member providing for the support and clamp to partake of restrained tilt;

means connected with said first clamp to move the clamp in a direction along the specimen axis away from the second clamp for applying load to the specimen, the specimen transmitting the load to the second clamp for effecting said restrained tilt;

a pair of air bearings;

means mounting the air bearings for independent translatory motion in a direction along an axis parallel to said specimen axis and for independent rotation about the axis;

a pair of strain followers respectively connected to said air bearings;

means for each bearing to rotate the same whereby to move the followers to make contact with the specimen for testing and to move away from the specimen when the specimen is not being tested; and means to maintain the strain followers in contact with the specimen during the test and the translatory motion of the air bearings providing for the bearings and followers to move as a function of the strain of the specimen.

13. In a testing machine for applying a load to a specimen for testing the same:
   means for mounting a specimen and for applying a load to the specimen along an axis;
   a pair of air bearings;
   means mounting the air bearings for independent translatory motion in a direction along an axis parallel to said specimen axis and for independent rotation about the axis;
   a pair of strain followers;
   means respectively connecting the strain followers with the air bearings for motion therewith;
   means for each air bearing to rotate the same whereby the bearing moves its follower to make contact with the specimen for testing and to move away from the specimen when the specimen is not being tested; and
   means to maintain the strain followers in contact with the specimen during a test, the translatory motion of the air bearings providing for the followers to move as a function of the strain of the specimen.

14. In a testing machine for applying a load to a specimen for testing the same:
   means for mounting a specimen and for applying a load to the specimen along an axis;
   a strain cradle;
   shaft means supporting the cradle for rotation on an axis parallel first said axis;
   a pair of air bearings mounted on said shaft with freedom for translatory motion along the shaft and for rotation about the shaft;
   a pair of strain follower arms respectively connected to the air bearings and extending radially outwardly from the shaft axis;
   a pair of strain followers respectively connected to said follower arms;
   a lift bar on said cradle;
   weight means on each follower arm and spaced from the shaft axis, each weight maintaining its arm contact with said lift bar; and
   means to rotate the strain cradle as between an operative position and an inoperative position, in the operative position the strain followers being in contact with specimen and in the in-operative position the strain followers being spaced away from and out of contact with the specimen and the lift bar moving the follower arms as between said positions.

15. In a testing machine for applying a load to a specimen for testing the same:
   means for mounting a specimen and for applying a load to the specimen along an axis;
   a strain cradle;
   shaft means supporting the cradle for rotation on an axis parallel to first said axis;
   a pair of air bearings mounted on said shaft with freedom for translatory motion along the shaft and for rotation about the shaft;
   a pair of strain follower arms respectively connected to the air bearings and extending radially outwardly from the shaft axis;
   means to maintain the air bearing in a fixed known relationship in a direction along the shaft axis when the specimen in not under test whereby the strain followers are spaced apart at a known gage length;
   a lift bar on said cradle;
   weight means on each follower arm and spaced from the shaft axis, each weight maintaining its arm in contact with said lift bar; and
   means to rotate the strain cradle as between an operative position and an inoperative position, in the operative position the strain followers being in contact with specimen and in the inoperative position the strain followers being spaced away from and out of contact with the specimen and the lift bar moving the follower arms as between said positions.

16. A construction in accordance with claim 15 wherein said means to maintain the gage length comprises:
   a fluid pressure cylinder connected to the cradle;
   a piston mounted in said cylinder, a gage arm connected to the piston and engaging one of the air bearings;
   abutment means on the cradle positioned to be engaged by the other air bearing; and
   means to supply fluid pressure to said cylinder to cause the piston to move in a direction so that the gage arm moves one air bearing against the other which in turn engages said abutment and to supply air to said cylinder to move the piston so that the gage arm is spaced from said one bearing whereby both bearings are free to move in translation during a test.

17. In a testing machine for applying a load to a specimen for testing the same:
   means for mounting a specimen and for applying a load to the specimen along an axis;
   a strain cradle;
   shaft means supporting the cradle for rotation on an axis parallel first said axis;
   a pair of air bearings mounted on said shaft with freedom for translatory motion along the shaft and for rotation about the shaft;
   a pair of strain follower arms respectively connected to the air bearings and extending radially outwardly from the shaft axis;
   a pair of strain followers respectively connected to said follower arms;
   a lift bar on said cradle;
   weight means on each follower arm and spaced from the shaft axis, each weight maintaining its arm in contact with said lift bar;
   means to rotate the strain cradle as between an operative position and an inoperative position, in the operative position the strain followers being in contact with specimen and in the inoperative position the strain followers being spaced away from and out of contact with the specimen and the lift bar moving the follower arms as between said positions, and the weights maintaining the strain followers in contact with the specimen during a test and the translatory motion of the air bearings providing for the followers to move as a function of the strain of the specimen;
   a transducer being a coil and a core elements;
   means connecting the coil to one of said air bearings to partake of the rotary and translating motion thereof; and
   means connecting the core to the other of said bearings to partake of the rotary and translatory motion thereof, the coil and core elements sensing the motion of the strain followers during a test.

18. In a testing machine for applying a load to a specimen for testing the same:
- a table for mounting a specimen;
- a hold-down finger pivotally mounted on said table, the weight of the finger normally holding the same down on the table but providing for a specimen to be inserted between the finger and the table;
- a strain cradle;
- a pair of strain followers respectively connected to said cradle;
- a lift bar on said cradle and positioned for contact with said hold-down finger; and
- means to rotate the strain cradle as between an operative position and an inoperative position, in the operation position the strain followers being in contact with specimen and in the inoperative position the strain followers being spaced away from and out of contact with the specimen and the lift bar moving said followers as between said positions and being out of contact with said finger in the inoperative position and being in contact with the finger in the operative position whereby to lift the finger away from the table.

* * * * *